Aug. 1, 1961     M. A. TREUHAFT     2,994,842

COUPLED-COIL WAVE CIRCULATOR

Filed Feb. 20, 1959

INVENTOR
*MILTON A TREUHAFT*
BY
ATTORNEY

2,994,842
COUPLED-COIL WAVE CIRCULATOR
Milton A. Treuhaft, Livingston, N.J., assignor to Polytechnic Institute of Brooklyn, Brooklyn, N.Y., a corporation of New York
Filed Feb. 20, 1959, Ser. No. 794,633
1 Claim. (Cl. 333—9)

This invention relates to wave circulators, that is, to 4-terminal or 4-port networks having non-reciprocal transmission between different terminals such that the energy flow pattern follows the cyclic substitution 1-4-3-2, where 1 and 3 are the terminals at one end of the network and 2 and 4 are the terminals at the other end.

The non-reciprocal transmission is obtained by the use of ferrite or similar material having non-reciprocal characteristics controlled by a magnetic field.

Among the objects of my invention is to produce a circulator having the following characteristics: compact and simple in construction; allows the easy use of permanent magnet type of ferrites with the elimination of or reduction in the amount of the direct current field structures; may be used equally well with waveguide or coaxial terminations, and may be used in a completely coaxial system; is relatively insensitive to frequency and may be easily broad banded; is capable of use in the UHF band and may have a length of three inches or less at a frequency of 200 megacycles; and may be used as a compact one-way line by terminating two of the ports with matched terminations.

Broadly, the invention comprises a pair of coils of equal turns and substantially equal lengths arranged on a common axis, in inductive relation with each other, and having ferrite material interposed in the space in which the coils are inductively coupled, to provide different phase constants for different directions of transmission of wave energy in the two coils. In the preferred embodiment of the invention, the two coils are helical coils wound one within the other.

Figure 1:
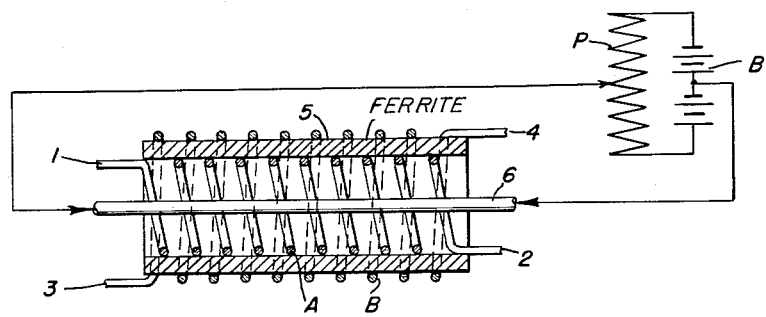
Figure 2:
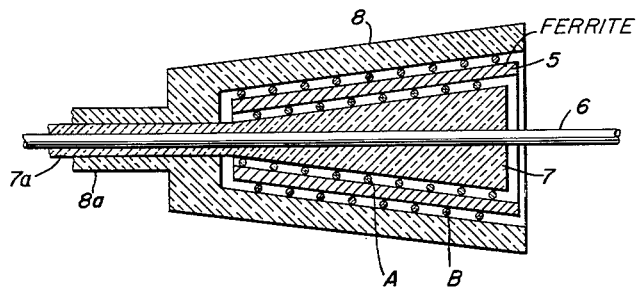

Two different forms of the circulator are illustrated in the accompanying drawing in which FIG. 1 is a sectional view taken along the longitudinal axis of the circulator in which the two coils are of cylindrical form; and FIG. 2 is a similar view of a second form in which the two coils are of conical form, and including means for varying the propagation constants of the two coils independently.

Referring to FIG. 1, the circulator is formed of two helical coils A and B, both of cylindrical form and wound on a common axis, coil B being somewhat larger than coil A and surrounding coil A. As shown in the drawing, it is preferred to wind coils A and B in opposite directions. Coil A has terminals 1 and 2 at opposite ends of the circulator and coil B has corresponding terminals 3 and 4. The annular space between coils A and B is filled with or occupied by a cylinder 5 of ferrite material. The cylinder 5 may constitute a winding form for the coil B, but it may be molded in place after the coils A and B have been preformed and set in proper relation, and in this case the turns of both windings A and B would be completely embedded within the ferrite cylinder.

Ferrite cylinder 5 is magnetized by a polarizing magnetic flux which flows circumferentially in the cylinder. For example, the flux may flow in a clockwise direction when viewed from the right end of cylinder 5. This magnetic flux may be produced by a permanent magnetization of the cylinder 5, or it may be established by or controlled by a direct current flowing through the conductor 6 passing through the cylinder 5 along its axis, or through a toroidal winding wound around the cylinder 5. The amount of magnetization of cylinder 5 may be controlled by controlling the direction and value of current flowing through the magnetizing conductor or winding by any suitable means represented in FIG. 1 by the tapped battery B and potentiometer P. The polarizing flux in cylinder 5 is at right angles to any flux which is produced in the cylinder by coils A and B.

When wave energy is applied to one terminal of FIG. 1, such as terminal 1 of coil A, wave energy will be induced in coil B, and two modes of propagation of energy will exist in the two coupled coils which produce well known "spacial beats." The chief characteristic of the phenomena of spacial beats is the fact that a given distance from the input terminal, all of the energy will be transferred from one coil to the other coil, provided the propagation constants of the two coils are equal. The distance at which 100% transfer occurs is called the beat half-wave length. Making the lengths of the coils one-half beat wave length in the left-to-right direction of transmission, and one full-beat wave length in the right-to-left direction of transmission, energy applied at terminal 1 of coil A will emerge at terminal 4 of coil B, and energy applied at 4 of coil B will emerge at terminal 3 of the same coil instead of terminal 1 of coil A. Energy applied at terminal 3 of coil B will emerge at terminal 2 of coil A, and energy applied at terminal 2 of coil A will emerge at terminal 1 of coil A.

The desired non-reciprocal transmission is obtained by designing the coils A and B such that their propagation constants satisfy the following relations:

$$\beta_c^+ l = \frac{\pi}{2} \text{ and } \beta_c^- l = \pi$$

where $l$ is the length of the coil; $\beta_c^+$ is the phase constant of the coil for left-to-right transmission; and $\beta_c^-$ is the phase constant of the coil for right-to-left transmission. With this design it will be seen that for one direction of transmission of energy along a coil there will be a phase shift of 180 degrees while for the reverse direction of transmission the phase shift will be only 90 degrees.

Since the propagation constants $\beta^+$ and $\beta^-$ for the two directions of transmission are both functions of the magnetizing flux in the ferrite cylinder 5, these constants may be adjusted simultaneously by varying the current in the magnetizing circuit, but they cannot be adjusted independently in the arrangement shown in FIG. 1.

In FIG. 2 I have shown an arrangement by which the propagation constants of the two coils may be adjusted independently of each other. This arrangement embodies the same elements as in FIG. 1, except that coils A and B and cylinder 5 are made conical in form instead of cylindrical. In order to vary the propagation constant of the inner coil A, a conical plug 7 of dielectric material is mounted within coil A for sliding movement on the rod 6. As shown in FIG. 2 the plug 7 is tightly coupled with the coil A, but, by moving the plug to the right, the coupling will be made progressively less tight, and thereby effect variation in the propagation constant of the coil A.

In a somewhat similar manner, the propagation constant of the outer coil B is varied by providing a conical shell 8 of dielectric material surrounding the coil B, the shell being mounted for sliding movement axially of the coil to vary the telescoping relation between the shell and the coil. One suitable arrangement for mounting the shell 8 is shown in FIG. 2 where the sleeve extension 8a of shell 8 is slidingly mounted on the sleeve extension 7a of the plug 7.

I claim:

A wave circulator comprising: a pair of conically shaped coils of equal turns and substantially equal lengths arranged on a common axis one within and inductively coupled to the other; ferrite material interposed in the space in which said coils are inductively coupled; means magnetizing said ferrite material with a polarizing flux at right angles to the flux produced by said coils in said material, thereby to provide different phase constants for different directions of transmission of wave energy in said coils, the length of said coils being such as to provide a phase shift of 180° for one direction of transmission and 90° for the opposite direction of transmission; a first plug-shaped dielectric member mounted for variable coupling movement into and out of the inner one of said coils; and a second dielectric member shell-shaped and surrounding the outer coil mounted for variable coupling therewith independently of said first dielectric member.

References Cited in the file of this patent

UNITED STATES PATENTS

| | | |
|---|---|---|
| 2,811,673 | Kompfner | Oct. 29, 1957 |
| 2,860,278 | Cook et al. | Nov. 11, 1958 |
| 2,884,604 | Miller | Apr. 28, 1959 |
| 2,925,565 | Cook et al. | Feb. 16, 1960 |

FOREIGN PATENTS

| | | |
|---|---|---|
| 674,874 | Great Britain | July 2, 1952 |

OTHER REFERENCES

Rich et al.: "Proceedings of the IRE," January 1955, pages 100–101.